United States Patent Office 3,471,500
Patented Oct. 7, 1969

3,471,500
PREPARATION AND DECOMPOSITION OF DISILOXANEDIOL COMPLEXES
Terry G. Selin, Schenectady, N.Y., assignor to General Electric Company, a corporation of New York
No Drawing. Continuation-in-part of application Ser. No. 514,660, Dec. 17, 1965. This application Nov. 22, 1968, Ser. No. 778,317
Int. Cl. C07f 7/08
U.S. Cl. 260—290                                10 Claims

ABSTRACT OF THE DISCLOSURE

Tertiary amine hydrohalide complexes of tetraaryldisiloxanediols, such as tetraphenyldisiloxanediol, are prepared by reacting tertiary amine hydrohalides with diarylsilanediols, such as diphenylsilanediol. These materials can be decomposed to the pure disiloxanediols which are useful for the preparation of cyclotrisiloxanes, which can be converted to polymeric materials.

---

This application is a continuation-in-part of copending application Ser. No. 514,660 filed Dec. 17, 1965, now abandoned.

This invention relates to a new process for the production of disiloxanediol complexes and the conversion of these complexes to the corresponding disiloxanediols.

One very useful material for the preparation of cyclotrisiloxanes which can subsequently be converted to polymeric materials are the symmetrical tetraaryldisiloxanediols, such as sym-tetraphenyldisiloxanediol. While many methods have been employed to obtain these disiloxanediols, no process has been available which leads to the production of these materials in high yield by an economical process.

It is an object of the present invention to provide an improved process for the production of a certain class of tetraaryldisiloxanediols.

A further object of the present invention is the preparation of tetraaryldisiloxanediol complexes which can be converted to tetraaryldisiloxanediols.

A still further object of the present invention is to provide a process for the production of tetraaryldisiloxanediols in good yields by economical processes from readily available starting materials.

These and other objects of this invention are accomplished by reacting a diarylsilanediol of the formula:

(1) 

where a tertiary amine hydrohalide of the formula:

(2)                Q·HX to produce an amine hydrohalide complex of a tetraaryldisiloxanediol of the formula:

(3) 

wherein R is selected from the group consisting of phenyl, alkylphenyl containing from 1 to 3 alkyl groups each of not more than 4 carbon atoms and haloalkylphenyl containing from 1 to 3 haloalkyl groups each of not more than 4 carbon atoms and 3 halogen atoms, Q is a tertiary amine selected from the group consisting of quinoline, pyridine, mono-, di- and trialkyl-substituted pyridine, wherein each alkyl moiety is of not more than 4 carbon atoms and

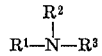

wherein $R^1$, $R^2$ and $R^3$ are selected from the group consisting of phenyl and alkyl of not more than 8 carbon atoms and X is halogen selected from the group consisting of chlorine, bromine, fluorine and iodine. The disiloxanediol amine hydrohalide complex can subsequently be decomposed in simple fashion to produce the tetraaryldisiloxanediol of the formula:

(4) 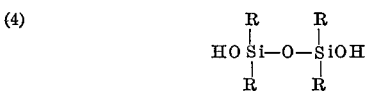

wherein R is as defined above. In the above formula, R can be, for example, phenyl, o-tolyl, m-tolyl, p-tolyl, 2,6-xylyl, p-ethylphenyl, p-butylphenyl, 2,6-dibutylphenyl, 2,4,6-trimethylphenyl, 2,4,6-triethylphenyl, 2-methyl-6-ethylphenyl, 2 - chloromethylphenyl, 2 - bromomethylphenyl, 2-iodomethylphenyl, 2,6-dichloromethylphenyl, 2,4-dichloroethylphenyl, p-trichloromethylphenyl, p-trifluoromethylphenyl and the like. In the above formula, $R^1$, $R^2$ and $R^3$ can be, for example, phenyl, methyl, ethyl, propyl, isopropyl, n-butyl, isobutyl, t-butyl, amyl, hexyl, heptyl, octyl and the isomers of alkyl of not more than 8 carbon atoms.

In the above formula, Q can be, for example, trimethylamine, triethylamine, tripropylamine, tributylamine, triamylamine, triphenylamine, ethyldiphenylamine, N,N-dimethylaniline, N,N-diethylaniline, N,N-dipropylaniline, N,N-dibutylaniline, methyl pyridine, diethyl pyridine, trimethylpyridine, diethyl pyridine, dibutyl pyridine, and the like.

In the preferred embodiment of my invention, R is phenyl, Q is pyridine, and X is chlorine.

The reaction which takes place to form the tertiary amine hydrohalide complex of Formula 3 is illustrated by the following equation:

(5) 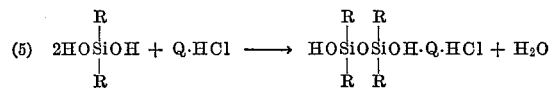

As shown by the above equation, two moles of a diarylsilanediol are reacted with one mole of the tertiary amine hydrohalide to produce one mole of the amine hydrohalide complex and one mole of water. In order to effect the reaction, the diarylsilanediol and the tertiary amine hydrohalide are mixed in approximately stoichiometric amounts, e.g., from about 1.75 to 2.25 moles of the diarylsilanediol per mole of the tertiary amine hydrohalide, in the presence of from about 40 to 80 percent by weight, based on the weight of the reaction mixture, of a substantially water-immiscible solvent and which is inert to the reactants under the conditions of the reaction and which has a boiling point of at least about 65° C., e.g., from about 65° C. to 175° C. The most desirable solvents for this purpose are hydrocarbon and halogenated hydrocarbon solvents, such as benzene, toluene, xylene, hexane, mineral spirits, trichloroethylene, perchloroethylene, etc. Other solvents, such as dipropyl ether, can also be employed. The function of the solvent is not primarily to dissolve the diarylsilanediol of Formula 1 or the tertiary amine hydrohalide or the disiloxane amine hydrohalide comple, but rather is to serve as a diluent for the reaction mixture to facilitate its manipulation.

After mixing the diarylsilanediol, the tertiary amine hydrohalide, and the solvent, the reaction mixture is heated to a temperature sufficiently high to remove water which is formed during the reaction. Generally, this is a temperature of the order of 65° C. to 120° C., depending upon the particular solvent employed. A particularly convenient solvent for the reaction is toluene and a particularly convenient temperature is the reflux temperature of the reaction mixture, which permits the removal of water as an azeotrope in an efficient fashion.

After completing removal of water from the reaction mixture, the result is an extremely high yield of the amine hydrohalide complex of Formula 2. The high yields of this complex are totally unexpected and in no way could have been predicted from the prior art. The complex of the disiloxanediol is formed almost to the complete exclusion of other possible products, with the conversion to the disiloxanediol being greater than 90% to 95%. The amine hydrohalide complex of the disiloxanediol is insoluble in the solvent employed, and can be separated by merely cooling the reactants to room temperature and isolating the complex by filtration. This complex, as a composition of matter, is described and claimed in my copending application Ser. No. 514,686 filed Dec. 17, 1965.

In the preferred embodiment of my invention, the disiloxanediol amine hydrohalide complex is isolated as described above and is then decomposed into the disiloxanediol and the amine hydrohalide by dissolving the complex in a liquid which is a solvent for both water and the disiloxanediol and which contains about 5% to 20% by weight water, based on the weight of the solvent and the water. After the complex is completely dissolved, enough additional water is added to the solution to precipitate the diol. Suitable solvents for both the disiloxanediol and water are generally the oxygenated solvents consisting of carbon, hydrogen, and oxygen. Typical of these solvents are ethers, such as dioxane and tetrahydrofuran; alcohols such as methanol, ethanol and propanol, isopropanol; and ketones such as acetone, methylethyl ketone, and methyl isobutyl ketone. Many other oxygenated solvents for water and the disiloxanediol of Formula 1 will be apparent to those skilled in the art.

To effect solution, the complex is added to the solution of water and solvent and the mixture is stirred for a few minutes until the complex dissolves. About five to ten parts by weight of the solution of water and solvent are used per part of the complex. When the additional water is added to the solution, the desired tetraaryldisiloxanediol precipitates instantly and is separated. The amount of water usually added to precipitate the diol is sufficient to provide more water than solvent originally present. That is, enough water is added so that the solvent comprises about 5 to 45 percent by weight, based on the total weight of the water and solvent. The decomposition of the complex into its component parts takes place with a yield better than 90 percent.

In an alternative method of decomposing the complex after it has been isolated, the complex can be added to a two-phase mixture of water and a hydrocarbon, halogenated hydrocarbon or other solvent of the same type in which the complex was formed. While the complex is not soluble in either the solvent or the water, the complex locates itself in the interface between the water and organic solvent phases and decomposes to the amine hydrohalide and the tetraaryldisiloxanediol of Formula 4. The disiloxanediol is soluble in the organic solvent and the amine hydrohalide is soluble in the water and the decomposition takes place spontaneously at the interface. After the complex is decomposed into its component parts, the aqueous layer is removed and the solvent is stripped from the disiloxanediol to produce the purified tetraaryldisiloxanediol of Formula 4. This decomposition reaction is also highly efficient and is effected in yields better than 90% to 95%. The amounts of solvent and water used in this alternative can vary widely, with satisfactory decomposition being accomplished when the water-solvent mixture contains from 25 to 75 percent by weight water and when the mixture is present in an amount equal to from about 5 to 20 parts by weight per part of the complex.

In the two preceding methods for decomposing the disiloxanediol amine hydrohalide complex, the complex has been isolated and then decomposed. It is also possible to decompose the complex without removing it from the hydrocarbon or halogenated hydrocarbon solvent slurry in which it is formed. This decomposition is effected by simply adding water to the slurry in an amount equal to from 0.5 to 10 parts by weight water per part by weight slurry. As in the preceding method, the complex settles at the interface between the water and the solvent, decomposes, and the disiloxanediol is isolated as before.

The following examples are illustrative of the practice of the present invention and are not intended for purposes of limitation.

Example 1

To a reaction vessel was added 43.2 g. of diphenylsilanediol, 11.5 g. of pyridine hydrochloride and 150 g. of toluene. This reaction mixture was brought to its reflux temperature, which varied from about 95° C. to 110° C. and refluxed 30 minutes during which time all of the water formed in the reaction was removed. The reaction mixture was then cooled to room temperature and 150 g. of water was added and the mixture was stirred. The amine hydrochloride complex settled in the interface between the water and the toluene and slowly decomposed to form a solution of sym-tetraphenyl-disiloxanediol in toluene and a solution of pyridine hydrochloride in water. The toluene layer was isolated and the toluene was stripped from the reaction mixture to produce pure sym-tetraphenyldisiloxanediol. The over-all yield of the reaction was 35.6 g. of tetraphenyldisiloxanediol corresponding to an 86% yield.

Example 2

This example illustrates the preparation and isolation of the pyridine hydrochloride complex of tetraphenyldisiloxanediol. To a reaction vessel was added 43.2 g. of diphenylsilanediol, 11.5 g. of pyridine hydrochloride and 150 g. toluene. This reaction mixture was refluxed to a temperature in the range of from 95° C. to 110° C. for 30 minutes during which time water was removed. The temperature of the reaction mixture was then reduced to room temperature and the tetraphenyldisiloxanediol pyridine hydrochloride complex precipitated from solution. This material was filtered from the reaction mixture and then recrystallized from a mixture of equal volumes of toluene and acetonitrile to produce the pure pyridine hydrochloride complex of tetraphenyldisiloxanediol which had a melting point of 146° C. to 149° C. The amount of complex recovered was 50.8 g. which corresponds to a yield of 96%.

Example 3

A mixture was prepared of 100 g. water and 85 g. diethyl ether. To this mixture was added 20 g. of the tetraphenyldisiloxanediol pyridine hydrochloride complex of Example 2. The mixture was stirred for 15 minutes and then allowed to separate into two phases. The lower phase was an aqueous solution of pyridine hydrochloride and the upper phase was an ether solution of the tetraphenyldisiloxanediol. The ether phase was separated and the ether stripped off, leaving 14.0 g. of tetraphenylidisiloxanediol-1,3 which corresponds to a 90% yield.

Example 4

A solution was prepared from 50 g. acetone and 5 g. of water. Added thereto was 20 g. of the tetraphenyldisiloxane complex of Example 2. The product was stirred and within 5 minutes a solution had been formed. Thereupon, 75 g. water was added and tetraphenyldisiloxanediol precipitated immediately as an oil which crystallized within 10 minutes. The crystals were filtered from the water-acetone solution of pyridine hydrochloride, giving 14.3 g. of the diol which corresponds to a 92% yield.

Example 5

To a reaction vessel was added 760 g. of bis-(p-chlorophenyl)silanediol, 270 g. of dimethylaniline hydrobromide and 800 g. of benzene. This reaction mixture was heated to the reflux temperature of about 80° C. and refluxed at this temperature for 30 minutes to remove all of the water. At the end of this time, the reaction mixture was cooled to room temperature to produce a slurry of the dimethylaniline hydrobromide complex of sym-tetra-kis-(p-chlorophenyl)disiloxanediol. This slurry was rapidly stirred to produce a uniform dispersion of the complex in the solvent and, while uniformly dispersed, the dispersion was divided into two equal parts. One part was permitted to settle, the benzene solvent was drawn off, warm air was blown over the resulting crystals to isolate the pure complex. This resulted in 470 g. of the complex which corresponds to a 94% yield. The second half of the slurry was mixed with an equal part of water, stirred rapidly and allowed to stand at room temperature. The crystals settled at the interface between the aqueous layer and the toluene layer and after standing for two hours, the complex had decomposed, with the disiloxane being present in the toluene layer and with the dimethylaniline hydrobromide being dissolved in the aqueous layer. The toluene solvent was stripped from the toluene layer and the resulting crystals were recrystallized from a mixture of one part toluene and two parts hexane yielding 271 g. of sym-tetra-(p-chlorophenyl)disiloxanediol, which corresponds to a 90% yield.

Example 6

To a reaction vessel was added 488 g. of di-m-tolylsilanediol, 138 g. of triethylamine hydrochloride and 1000 g. of toluene. The reaction mixture was heated at the reflux temperature to remove water, the resulting solution was cooled to room temperature, an amount of water equal to the amount of the reaction mixture was added and shaken and the reaction mixture was allowed to stand for two hours. During this time, the crystalline material which had formed settled in the interface and then slowly disappeared, with the disiloxane going into the toluene phase and the triethylamine hydrochloride going into the aqueous phase. Following the procedure of the preceding examples, the sym-tetra-(m-tolyl)-disiloxanediol was isolated in an amount equal to 400 g., which corresponds to an 85% yield.

While the foregoing examples have illustrated a number of the embodiments of my invention, it is understood that my invention is directed broadly to the preparation of the tetraaryldisiloxanediol complexes of Formula 3 by the reaction of the diarylsilanediol of Formula 1 with an amine hydrohalide of Formula 2 with sufficient heat to remove water. This invention is also directed to the overall reaction in which the diarylsilanediol is reacted with the amine hydrohalide to form a complex, and the resulting complex is decomposed to form the tetraaryldisiloxanediol.

What I claim as new and desire to secure by Letters Patent of the United States is:

1. Process for the preparation of tetraaryldisiloxanediol amine hydrohalide complexes of the formula:

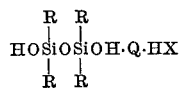

which consists essentially of mixing a diarylsilanediol of the formula:

with an amine hydrohalide of the formula:

Q·HX and heating the resulting mixture at a temperature of the order of 65° C. to 120° C. to remove formed water, the reactants being employed in the ratio of approximately two moles of the diarylsilanediol per mole of the amine hydrohalide, wherein R is selected from the group consisting of phenyl, alkylphenyl containing from 1 to 3 alkyl groups each of not more than 4 carbon atoms and haloalkylphenyl containing from 1 to 3 haloalkyl groups each of not more than 4 carbon atoms and 3 halogen atoms, Q is a tertiary amine selected from the group consisting of quinoline, pyridine, mono-, di- and tri-alkyl-substituted pyridine, wherein each alkyl moiety is of not more than 4 carbon atoms and

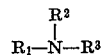

wherein $R^1$, $R^2$ and $R^3$ are selected from the group consisting of phenyl and alkyl of not more than 8 carbon atoms and X is halogen selected from the group consisting of chlorine, bromine, fluorine and iodine.

2. Process of claim 1 in which R is phenyl.
3. Process of claim 1 in which Q is pyridine.
4. Process of claim 1 in which X is chlorine.
5. Process of claim 1 in which R is phenyl, Q is pyridine, and X is halogen.
6. Process for forming a tetraaryldisiloxanediol having the formula:

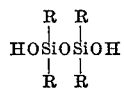

which consists essentially of (1) heating a mixture of ingredients in the ratio of approximately two moles of a diarylsilanediol of the formula:

and one mole of an amine hydrohalide having the formula:

Q·HX in the presence of an inert solvent at a temperature of the order of 65° C. to 120° C. and for a time sufficient to remove water formed during the reaction between said diarylsilanediol and said amine hydrohalide, (2) isolating a complex having the formula:

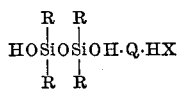

from the above heating step by cooling the reaction mixture and removing said complex, (3) decomposing said complex by contacting the complex with a mixture of water and a solvent for said tetraaryldisiloxanediol, and (4) isolating said tetraaryldisiloxanediol, wherein R is selected from the group consisting of phenyl, alkylphenyl containing from 1 to 3 alkyl groups each of not more than 4 carbon atoms and haloalkylphenyl containing from 1 to 3 haloalkyl groups each of not more than 4 carbon atoms and 3 halogen atoms, Q is a tertiary amine selected from the group consisting of quinoline, pyridine, mono-, di- and trialkyl-substituted pyridine, wherein each alkyl moiety is of not more than 4 carbon atoms and

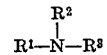

wherein $R^1$, $R^2$ and $R^3$ are selected from the group consisting of phenyl and alkyl of not more than 8 carbon atoms and X is halogen selected from the group consisting of chlorine, bromine, fluorine and iodine.

7. Process of claim 6 in which R is phenyl, Q is pyridine and X is halogen.

8. Process of claim 6 in which the inert solvent used in decomposing said complex is a solvent for both said tetraaryldisiloxanediol and said water.

9. Process for forming a tetraaryldisiloxanediol of the formula:

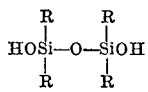

which consists essentially of heating a mixture of ingredients in the ratio of approximately two moles of a diarylsilanediol of the formula:

and one mole of an amine hydrohalide of the formula:

$$Q \cdot HX$$

in the presence of an inert solvent at a temperature of the order of 65° C. to 120° C. to remove water formed during the reaction, thereafter cooling the reaction mixture and adding water to form a two-phase reaction mixture, allowing the mixture to stand for a sufficient time to permit decomposition of intermediate products, separating the solvent layer from said two-phase mixture and isolating said tetraaryldisiloxanediol from the reaction mixture, wherein R is selected from the group consisting of phenyl, alkylphenyl containing from 1 to 3 alkyl groups each of not more than 4 carbon atoms and haloalkylphenyl containing from 1 to 3 haloalkyl groups each of not more than 4 carbon atoms and 3 halogen atoms, Q is a tertiary amine selected from the group consisting of quinoline, pyridine, mono-, di- and trialkyl-substituted pyridine, wherein each alkyl moiety is of not more than 4 carbon atoms and

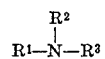

wherein $R^1$, $R^2$ and $R^3$ are selected from the group consisting of phenyl and alkyl of not more than 8 carbon atoms and X is halogen selected from the group consisting of chlorine, bromine, fluorine and iodine.

10. The process of claim 9 in which R is phenyl, Q is pyridine and X is chlorine.

References Cited

UNITED STATES PATENTS 3,222,369  12/1965  Prescott et al. _____ 260—290

HENRY R. JILES, Primary Examiner

C. M. SHURKO, Assistant Examiner

U.S. Cl. X.R.

260—283, 448.2